UNITED STATES PATENT OFFICE.

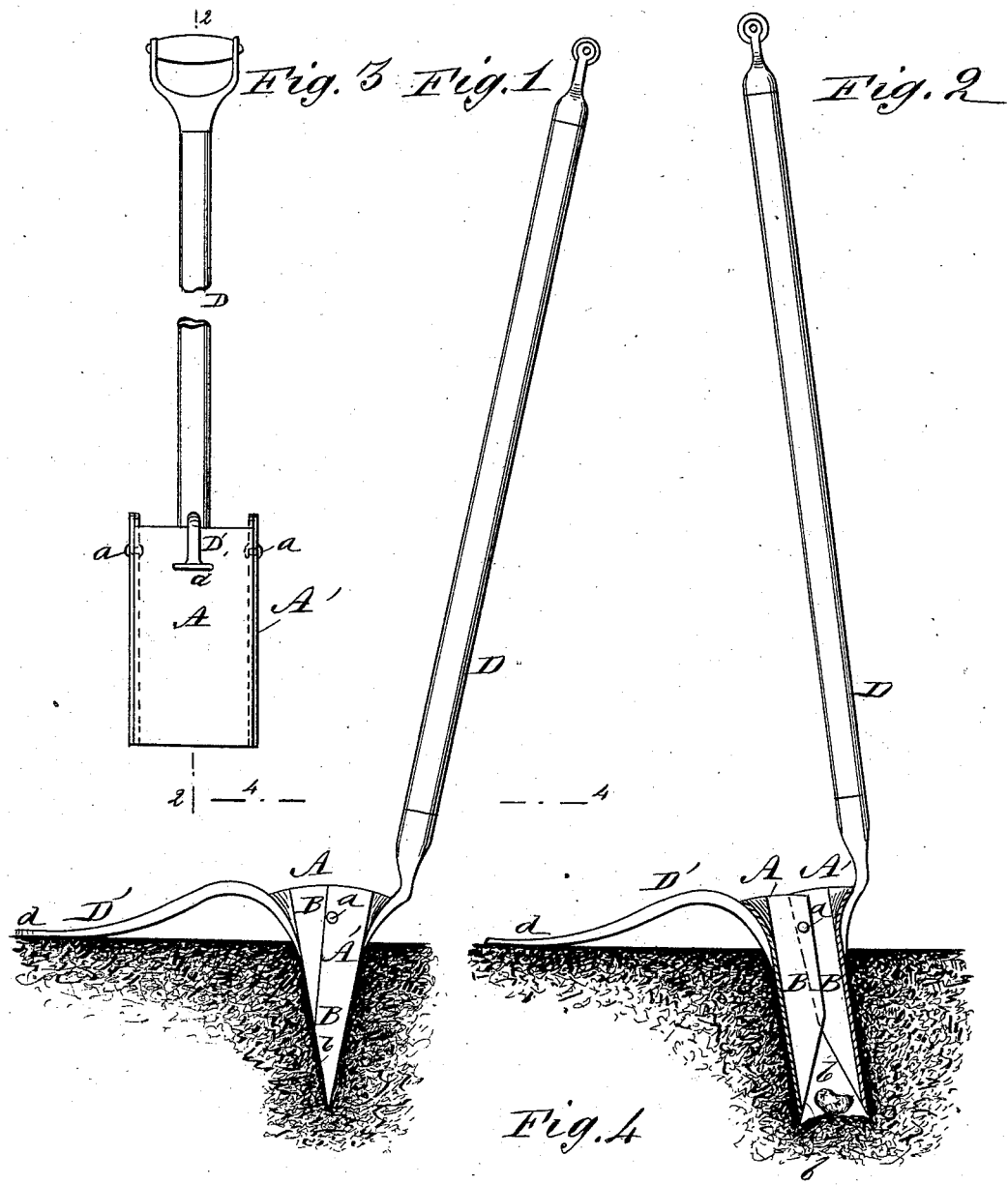

ALFRED W. BLACK, OF TRAVERSE CITY, MICHIGAN.

PLANTER.

SPECIFICATION forming part of Letters Patent No. 382,069, dated May 1, 1888.

Application filed June 22, 1887. Serial No. 242,144. (No model.)

*To all whom it may concern:*

Be it known that I, ALFRED W. BLACK, of Traverse City, in the county of Grand Traverse and State of Michigan, have invented a new and Improved Planter, of which the following is a full, clear, and exact description.

My invention relates to a planter for use with potatoes or other sets, and has for its object to provide a simple and cheap device easily manipulated whereby the sets may be quickly planted and spaced.

The invention consists in the construction and combination of the several parts, as will be hereinafter fully set forth, and pointed out in the claim.

Reference is to be had to the accompanying drawings, forming a part of this specification, in which similar letters of reference indicate corresponding parts in all the figures.

Figure 1 is a side elevation of the device closed. Fig. 2 is a vertical section taken partially on line 2 2 of Fig. 3, the jaws being open. Fig. 3 is a front elevation of the device, and Fig. 4 is a horizontal section on line 4 4 of Fig. 1.

In carrying out the invention the planter is constructed with two jaws, A A', of suitable metal, rectangular in shape, their sides B being formed by bending the metal upon itself outward at right angles to the body, which sides are cut away at *b* from a point near the center at an inclination downward flush with the body at the bottom.

The jaw A is slightly narrower than the jaw A', and the sides of the former being introduced between the sides of the latter are pivoted thereto by suitable pins, *a*, near the top.

To the outer jaw, A', centrally the top, a handle, D, is secured, adapted to extend vertically upward, which handle may be of any approved shape, and opposing the said handle a curved outwardly-extending rod, D', is attached to the jaw A centrally the top, having a flattened outer end, *d*. Thus when the jaws are in a closed or normal position, as shown in Fig. 1, they partake of a wedge-like form, whereby they are readily introduced in the ground.

In operation the sets, being carried by the operator in a bag or other receptacle suspended from a belt or from the shoulder, are dropped into the planter, when the jaws are closed. The said jaws are then forced in the ground, as shown in Fig. 1, the rod D' serving to regulate the depth, which may be varied by keeping the handle in a strictly horizontal position or at an inclination toward the operator. To drop the set, the handle is carried forward, and, the rod D' acting as a fulcrum, the jaws are separated at the bottom, as shown in Fig. 2, allowing the contents of the planter to drop therefrom. The device may now be withdrawn and the operation repeated, the mark left by the rod D' in the soil serving to gage the distance for the next hill.

Having thus fully described my invention, what I claim as new, and desire to secure by Letters Patent, is—

A planter consisting of the outwardly-flared jaws of rectangular shape, with their sides extended at right angles thereto and inclined upon the inner edges from near the center downward flush with the bottom edges of said jaws, and which sides are pivoted together near their upper edges, one of said jaws having a handle and the other jaw having a horizontal outwardly-extending gage-arm, substantially as specified.

ALFRED W. BLACK.

Witnesses:
WM. HOLDSWORTH,
GEO. W. HALL.